No. 767,152. Patented August 9, 1904.

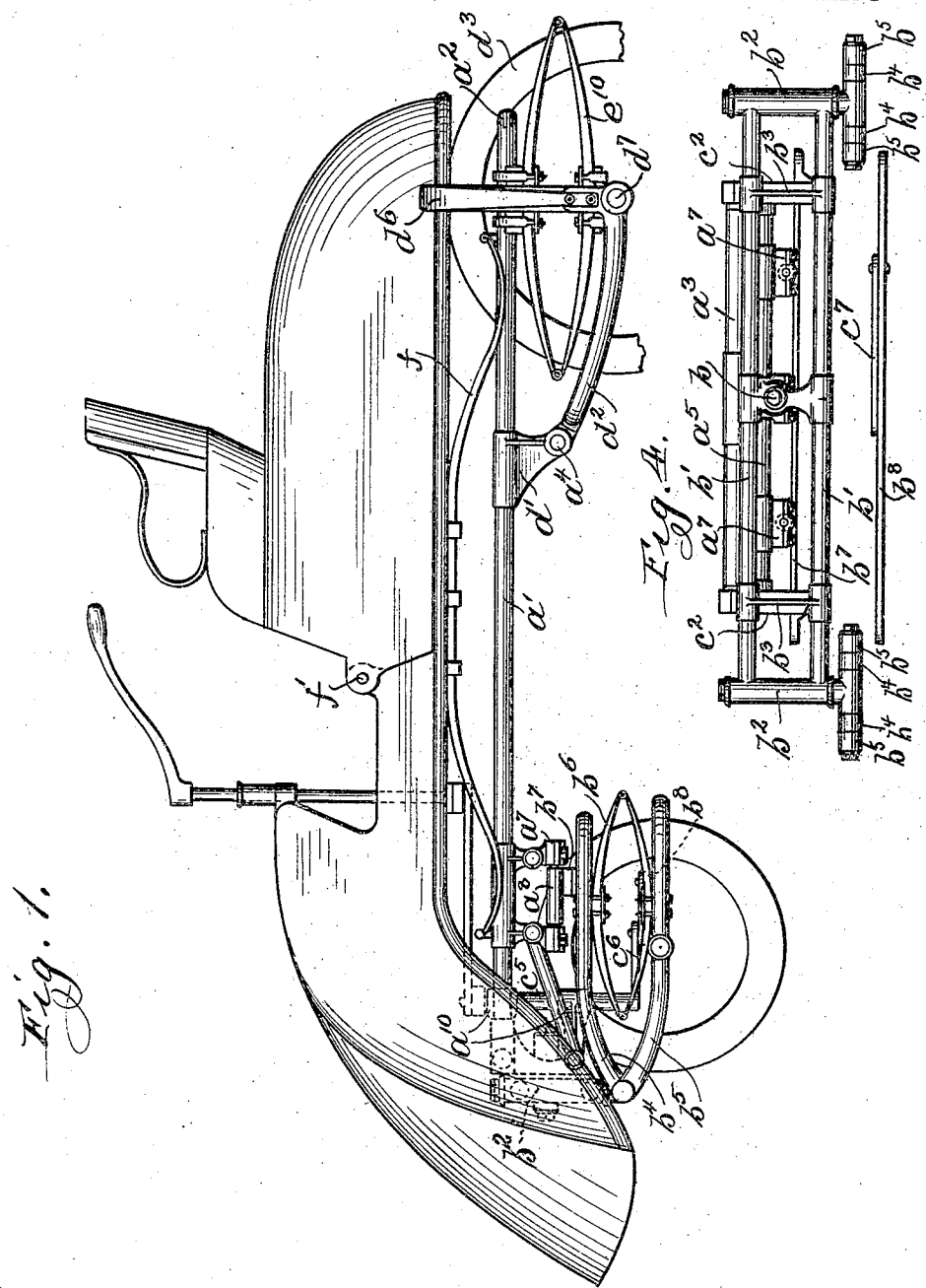

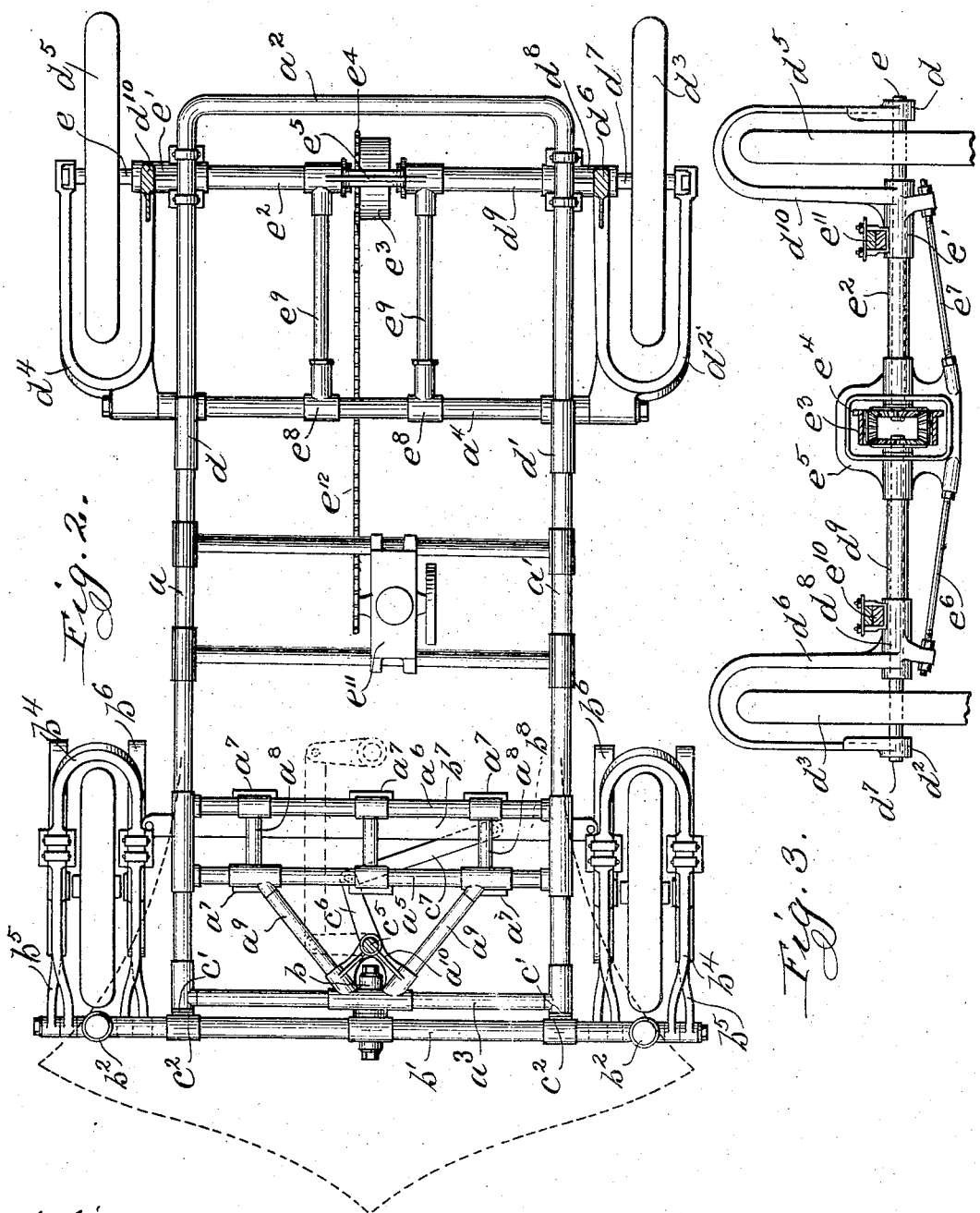

UNITED STATES PATENT OFFICE.

EDWIN J. JENNESS, OF CHICAGO, ILLINOIS.

AUTOMOBILE.

SPECIFICATION forming part of Letters Patent No. 767,152, dated August 9, 1904.

Application filed March 22, 1901. Serial No. 52,330. (No model.)

*To all whom it may concern:*

Be it known that I, EDWIN J. JENNESS, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to an automobile or horseless vehicle.

In vehicles of the class to which the present invention relates it has been the usual practice to mount the guiding-wheels, which are usually the front wheels of the vehicle, in such a manner that it is necessary for the driver or operator to exert a continuous effort in order to maintain the travel of the vehicle in a direct line. If this effort be not continually exerted, any obstacles or roughness in the roadway will tend to throw the guiding-wheels into a position oblique to the line of travel, thereby altering the direction of movement of the vehicle.

It is the object of the present invention to provide a form of mounting for the guiding-wheels which will cause the wheels to tend to maintain a position parallel to the axis of the vehicle, so that if the hand be removed from the steering mechanism the wheels will tend to assume a position which directs the vehicle in a straight line. With this construction effort on the part of the driver is required only when he desires to change the direction of movement of the vehicle. To accomplish this result, I provide what I term a "trailing frame," upon which the guiding-wheel is mounted. In the preferred form this trailing frame takes the form of a structure upon which the wheel is journaled and carrying at the forward end a journal which is adapted to fit in a bearing carried upon the vehicle-frame, so that the wheel may be moved into a plane oblique to the line of travel by swinging the trailing frame about the upright axis of rotation. As the front wheels of the vehicle are usually employed as the guiding-wheels, I mount each of the front wheels upon an independent trailing frame and connect the two frames with the steering mechanism, whereby they may be moved in unison to direct the movement of the vehicle.

A further feature of my invention consists in the employment of means for mounting the vehicle-frame so that the same will not necessarily partake of the movement of the several wheels of the vehicle. To accomplish this result, I mount the wheels upon what I term "wheel-frames," which are resiliently connected with the vehicle-frame, whereby the wheels may partake of movements due to the roughness or obstacles in the roadway without imparting corresponding movements to the main frame of the vehicle. In practice I propose to pivot the wheel-frames at the forward end and limit the movement of the rear end by means of springs or other resilient devices interposed between the wheel-frame and the main frame. I preferably mount each of the guiding-wheels upon a separate wheel-frame. The rear wheels may be mounted in a similar manner where the driving-motor will permit; but where a single driving-motor is employed I preferably mount both of the rear wheels upon the same wheel-frame. By thus employing for the wheels independent wheel-frames resiliently connected with the main frame the main frame is permitted to float along, as it were, without partaking of the movement of the wheels as the same rise and fall, due to the roughness of the roadway.

A further feature of my invention contemplates the employment of two sets of springs or resilient devices—one between the several wheels and the main frame carrying the driving-motor and the other between the main frame and the bed or box of the vehicle in which the occupants of the vehicle ride. By this construction the main frame does not partake of the movement of the individual wheels, nor does the bed or box partake of the movement of either the main frame or the wheels. As the driving-motor is of considerable weight, its vibration due to the roughness of the roadway is very objectionable if imparted to the bed of the vehicle, and by this arrangement the bed of the vehicle is entirely independent of the vibration of the driving-motor, and, again, the vibration of the motor is greatly decreased, due to the independent mounting of the wheels.

I have illustrated my invention in the accompanying drawings, in which—

Figure 1 is a vertical longitudinal view of an automobile of my invention. Fig. 2 is a plan view thereof with the bed or body of the vehicle removed. Fig. 3 is a rear view of the back-wheel frame. Fig. 4 is a vertical view of the front-wheel frame.

Like letters refer to like parts in the several figures.

As shown in Fig. 2, the main frame is composed of the side bars $a$ and $a'$ and the end bars $a^2$ and $a^3$. Between the side bars are the cross bars or braces $a^5$ and $a^6$, near the forward end of the main frame. I do not wish to limit myself to this specific construction for the main frame, as other constructions could be used.

Mounted upon the cross bars or braces $a^5$ and $a^6$ are the bearings $a^7$ $a^7$, within which are journaled the rollers $a^8$ $a^8$. Between the cross-bar $a^5$ and the end bar $a^3$ are two braces $a^9$ and $a^9$. The steering-gear rod is journaled in the casting $a^{10}$. The forward ends of the side bars $a$ and $a'$ are provided with shoes $c'$ $c'$, upon which corresponding shoes $c^2$ $c^2$ of the front axle slide.

Pivoted to the main frame at $b$ is the vertically-oscillating front axle, comprising two parallel bars $b'$ $b'$ and two end barrels $b^2$ $b^2$, which form the bearings for the journals of the trailing frames. The said bars $b'$ $b'$ have braces $b^3$ $b^3$ between them. The said axle is thus free to oscillate about the pivot $b$, being guided in its movement by the shoes $c'$ and $c^2$.

The trailing frame for the front wheel consists of a trailing arm $b^4$, which may be termed the "trailing frame proper," and the wheel-frame $b^5$. The spring $b^6$ is interposed between the trailing arm $b^4$ and the wheel-frame $b^5$, so as to take up the vibrations given to the wheel as it travels over the surface of the roadway. I do not wish to restrict myself to such a spring as shown, as a coiled spring would accomplish the same results, or any resilient material, such as rubber. The front wheel is journaled to the wheel-frame $b^5$. The trailing arm $b^4$ and the wheel-frame $b^5$ are both pivoted to the journal which works in the barrel $b^2$. The barrel $b^2$ need not be in a vertical position, as any upright position would accomplish the same results so long as the wheel remains a trailing wheel. Each of the front wheels is preferably associated with a wheel-frame and a trailing frame, as above described.

Pivoted to the two trailing frames is a bar or runner $b^7$, adapted to engage the rollers $a^8$ $a^8$. Likewise the wheel-frames $b^5$ $b^5$ are connected together by a bar $b^8$, which is pivoted at opposite ends to the said frames.

Any suitable steering-gear may be used, and I have illustrated a steering-rod $c^5$, having formed integral with it at one end an angular projecting arm $c^6$, the said arm $c^6$ being connected with the bar or runner $b^8$ by a link $c^7$. The steering-rod $c^5$ is journaled in bearings $a^{10}$ $a^{10}$. A suitable handle may be connected with the steering-rod in any preferred manner. The rocking of the steering-rod $c^5$ causes the arm $c^6$ to move the link $c^7$, thereby moving the bar $b^8$. As the arm $c^6$ moves, the runner $b^8$, which is connected therewith by the link $c^7$, is correspondingly moved to rock the trailing frames upon their journals, and thereby carry the wheels into the desired angular position relatively to the main frame to guide the vehicle in the desired direction. Due to the fact that the mounting of the wheel makes the same a trailing wheel the tendency of the wheel is to remain in a plane parallel to the axial plane of the main frame. Consequently the vehicle tends to move straight forward, unless the steering-gear be manipulated to vary the angular position of the wheels. If the hand be removed from the steering-handle, the tendency of the wheels is to resume the normal position parallel to the main frame.

Mounted upon the side-bars $a$ and $a'$ are the castings $d$ $d'$, to which the shaft $a^4$ is journaled at opposite ends. The yoke $d^2$ of the wheel-frame for the back wheel $d^3$ is journaled to the end of the shaft $a^4$, which projects beyond the casting $d'$, and the yoke $d^4$ of the wheel-frame for the back wheel $d^5$ is journaled to the other end of the shaft $a^4$, which projects beyond the casting $d$.

The wheel-frame for the back wheel $d^3$ is formed of two yokes, one yoke, $d^2$, extending around the front of the said wheel and the other yoke, $d^6$, extending over the top of the said wheel. The yoke $d^2$ is journaled to the axle $d^7$ and forms part of the casting $d^8$. The yoke $d^6$ is secured to the yoke $d^2$ and also forms part of the casting $d^8$. The tube $d^9$ is adapted to fit inside the bore of the casting $d^8$ and is brazed or secured to the said casting in any preferred manner, so as to form a rigid connection therewith.

The wheel-frame for the back wheel $d^5$ is of the same construction as above described. The wheel-frame for said wheel $d^5$ is formed of two yokes, one yoke, $d^4$, extending around the front of the said wheel and the other yoke, $d^{10}$, extending over the top of the said wheel. The yoke $d^4$ is journaled to the axle $e$ and forms part of the casting $e'$. The yoke $d^{10}$ is secured to the yoke $d^4$ and also forms part of the casting $e'$. The tube $e^2$ is adapted to fit inside the bore of the casting $e'$ and is brazed or secured to the said casting in any preferred manner, so as to form a rigid connection therewith. The axle $d^7$ of the back wheel $d^3$ is journaled inside the tube $d^9$. The inner end of the shaft $d^7$ is provided with a bevel gear-wheel, which forms part of the differential driving-gear contained within the drum $e^3$. The axle $e$ of the back wheel $d^5$ is journaled inside the tube $e^2$. The inner end of the shaft $e$ is provided with a bevel gear-wheel, which also forms a part of the differential gearing. The exterior surface of the drum $e^3$ serves as a braking-wheel. Secured to the drum $e^3$ is a sprocket-wheel $e^4$, with which the motor or engine $e^{11}$, mounted on the main frame, is connected by a chain $e^{12}$ or other suitable means. Joining the ends of the tubes $e^2$ and $d^9$ is a casting $e^5$. The said casting is brazed to the said tubes or secured in any preferred manner, so as to form a rigid connection. The rod $e^6$ extends from the casting $d^8$ to the casting $e^5$, and the rod $e^7$ extends from the casting $e'$ to the casting $e^5$. The rods $e^6$ and $e^7$ act as braces for the casting $e^5$.

Secured to the shaft $a^4$ are the castings $e^8$ $e^8$. Screwed into the said castings $e^8$ $e^8$ and screwed into the casting $e^5$ are the rods $e^9$ $e^9$, bracing the casting $e^5$.

The frame for the rear wheels, as above described, oscillates about the shaft $a^4$.

Interposed between the tube $d^9$ and the side bar $a'$ is a spring $e^{10}$. The said spring $e^{10}$ is secured to both the tube $d^9$ and the side bar $a'$. Likewise interposed between the tube $e^2$ and the side bar $a$ is a spring $e^{11}$. The said spring $e^{11}$ is secured to both the tube $e^2$ and the side bar $a$. The springs $e^{10}$ and $e^{11}$ take up the vibrations which are given to the back wheels as they travel over the roadway.

The body or bed of the vehicle is mounted upon two springs $f$ $f$—one one either side of the main frame and fixedly attached thereto. The body or bed of the vehicle is thus independently spring-mounted on the main frame. The main frame is independently spring-mounted on the wheels, and the wheels are independently spring-mounted. By this method of mounting the bed, main frame, and wheels the tendency of imparting to the bed the vibrations generated as the vehicle travels over the roadway is reduced to a minimum. The rear portion of the body or bed is pivoted at a point $f'$ forward of the seat. This construction permits the rear end to be lifted and allows the operator to get at any part of the motor or engine should it get out of order.

The motor or engine is adapted to be mounted on the side bars $a$ and $a'$ of the main frame, and the rear hinged portion of the bed is adapted to form a cover or box for the said motor or engine. The motor may be of any desired type, as electric motor, steam-engine, gas-engine, or the like.

Having described my invention, what I claim as new, and desire to secure by Letters Patent, is—

1. In a vehicle, the combination with a vertically-oscillating axle, of a trailing frame journaled thereto, and a wheel journaled upon said frame, substantially as described.

2. In a vehicle, the combination with a vertically-oscillating axle, of a pair of trailing frames journaled thereto, and a wheel journaled upon each of said trailing frames, substantially as described.

3. In a vehicle, the combination with a main frame, of a laterally-swinging trailing frame pivoted thereto, a wheel journaled upon said trailing frame, and a support for the swinging end of said trailing frame, said support having roller-bearings upon said main frame, substantially as described.

4. In a vehicle the combination with a main frame, of a laterally-swinging trailing frame pivoted thereto, a wheel journaled upon said trailing frame, and a resilient support for the swinging end of said trailing frame, said support having roller-bearings upon said main frame, substantially as described.

5. In a vehicle, the combination with a vertically-oscillating axle, of a trailing frame journaled thereto and a wheel resiliently journaled upon said frame, substantially as described.

6. In a vehicle, the combination with a vertically-oscillating axle, of a pair of trailing frames journaled thereto, and a wheel resiliently journaled upon each of said frames, substantially as described.

7. In a vehicle, the combination with a vertically-oscillating axle, of a laterally-swinging trailing frame journaled thereto and a wheel resiliently journaled upon said frame, substantially as described.

8. In a vehicle, the combination with a vertically-oscillating axle, of a pair of laterally-swinging trailing frames journaled thereto, and a wheel resiliently journaled upon each of said frames, substantially as described.

9. In a vehicle, the combination with a vertically-oscillating axle, of a pair of laterally-swinging trailing frames journaled thereto and a guiding-wheel resiliently journaled upon each of said frames, substantially as described.

10. In a vehicle, the combination with a main frame, of a laterally-swinging trailing wheel-frame journaled to rock relatively thereto, a guiding-wheel journaled upon said wheel-frame, and a resilient device interposed between said wheel-frame and the main frame, substantially as described.

11. In a vehicle, the combination with a main frame, of a wheel-frame journaled thereto, a pair of driving-wheels journaled upon said wheel-frame, and a resilient connection interposed between said wheel-frame and the main frame, substantially as described.

12. In a vehicle, the combination with a laterally-swinging trailing frame, of a vertically-swinging wheel-frame mounted thereon, and a wheel journaled upon said wheel-frame, substantially as described.

13. In a vehicle, the combination with a laterally-swinging trailing frame, of a vertically-oscillating wheel-frame, a wheel journaled upon said wheel-frame and a resilient connection between said wheel-frame, and said trailing frame, substantially as described.

14. In a vehicle, the combination with a vertically-oscillating axle, of a laterally-swinging trailing frame journaled thereto, a vertically-oscillating wheel-frame journaled to said trailing frame, a wheel journaled upon said wheel-frame, and a resilient connection between said wheel-frame and said trailing frame, substantially as described.

15. In a vehicle, the combination with a vertically-oscillating axle, of a pair of laterally-swinging trailing frames journaled to the ends thereof, a vertically-oscillating wheel-frame journaled to each of said trailing frames, a wheel mounted upon each of said wheel-frames, a resilient connection between each wheel-frame and corresponding trailing frame, and steering mechanism for swinging said trailing frames, substantially as described.

16. In a vehicle, the combination with a main frame, of a vertically-oscillating wheel-frame journaled to the rear of said main frame, and resiliently connected therewith, a pair of driving-wheels, mounted upon said rear-wheel frame, a vertically-oscillating front axle, a pair of laterally-swinging trailing frames journaled to the ends of said axle, a vertically-oscillating wheel-frame mounted upon each trailing frame and resiliently connected therewith, and a pair of guiding-wheels one mounted upon each of said latter-mentioned wheel-frames, substantially as described.

17. In a vehicle, the combination with a main frame, of a bed or box resiliently mounted thereon, vertically-oscillating wheel-frames resiliently connected with said main frame, wheels carrying the weight of the vehicle journaled in said frame, substantially as described.

18. In a vehicle, the combination with a main frame, of a driving-motor mounted thereon, a box or bed resiliently mounted upon said main frame, and wheels upon which said main frame is resiliently supported, substantially as described.

19. In a vehicle, the combination with a main frame, of a driving-motor carried thereon, a bed or box resiliently mounted upon said frame, a pivotal mounting for said bed or box permitting the swinging of the same to disclose the driving-motor, and wheels upon which said main frame is resiliently supported, substantially as described.

20. In a vehicle, the combination with two trailing frames and the wheels mounted thereon, of a bar or runner adapted to connect said trailing frames, and to support the main frame of said vehicle at one or more points, substantially as described.

In witness whereof I have hereunto subscribed my name in the presence of two witnesses.

EDWIN J. JENNESS.

Witnesses:
MELANCTHON R. NYMAN,
W. CLYDE JONES.